(12) United States Patent
Grobler et al.

(10) Patent No.: US 9,027,930 B2
(45) Date of Patent: May 12, 2015

(54) METHOD AND COMPOSITION FOR SEALING PASSAGES

(75) Inventors: Nico Johan Grobler, Atwell (AU); Deon Van Dyk, Salter Point (AU)

(73) Assignee: Relborgn Pty Ltd, Claremont (AU)

( * ) Notice: Subject to any disclaimer, the term of this patent is extended or adjusted under 35 U.S.C. 154(b) by 451 days.

(21) Appl. No.: 12/996,103

(22) PCT Filed: Jun. 3, 2009

(86) PCT No.: PCT/AU2009/000697
§ 371 (c)(1),
(2), (4) Date: Jan. 21, 2011

(87) PCT Pub. No.: WO2009/146493
PCT Pub. Date: Dec. 10, 2009

(65) Prior Publication Data
US 2011/0115166 A1    May 19, 2011

(30) Foreign Application Priority Data

Jun. 3, 2008 (AU) ................................ 2008902804

(51) Int. Cl.
| | | |
|---|---|---|
| E04B 1/682 | (2006.01) | |
| C09K 8/00 | (2006.01) | |
| C08K 5/09 | (2006.01) | |
| C09K 17/48 | (2006.01) | |
| C09K 17/18 | (2006.01) | |

(52) U.S. Cl.
CPC . *C09K 17/48* (2013.01); *C08K 5/09* (2013.01); *C09K 17/18* (2013.01)

(58) Field of Classification Search
USPC ............................ 523/130; 277/316; 524/300
See application file for complete search history.

(56) References Cited

U.S. PATENT DOCUMENTS

| | | | | |
|---|---|---|---|---|
| 3,727,412 | A |   | 4/1973 | Marx et al. |
| 3,761,455 | A | * | 9/1973 | Tanaka et al. ............... 528/487 |
| 4,296,932 | A |   | 10/1981 | Grobler |
| 6,177,483 | B1 | * | 1/2001 | Tehrani et al. ............. 523/130 |
| 6,258,757 | B1 | * | 7/2001 | Sweatman et al. ......... 507/219 |

(Continued)

FOREIGN PATENT DOCUMENTS

| | | |
|---|---|---|
| JP | 2002772022 A | 10/2000 |
| JP | 2004251010 A | 9/2004 |

(Continued)

OTHER PUBLICATIONS

Zagari, Giuseppe; PCT International Search Report, Jul. 17, 2009; pp. 1-3.

*Primary Examiner* — Peter F Godenschwager
*Assistant Examiner* — David Karst
(74) *Attorney, Agent, or Firm* — Ballard Spahr LLP

(57) ABSTRACT

A method of sealing a passage in a body with a sealing composition comprising (a) a major proportion of a latex emulsion or colloid; and (b) a minor proportion of lauric acid or a laurate compound; and (c) at least one further selected additive, ideally a latex coagulation inhibitor, wherein said composition is pumped into said passage where it is set or coagulated to form a seal. Advantageously, the laurate compound is ammonium laurate and coagulation is conveniently induced by adjusting pH of the sealing composition from alkaline to acidic pH range. The method is particularly well suited to sealing in faulty formations or sealing sites and may be used in sealing within salt mines which contain brines.

17 Claims, 1 Drawing Sheet

(56) References Cited

U.S. PATENT DOCUMENTS

| | | |
|---|---|---|
| 6,419,017 B1 | 7/2002 | Metcalf et al. |
| 6,608,131 B1 | 8/2003 | Winterowd et al. |
| 2006/0122071 A1* | 6/2006 | Reddy et al. .................. 507/219 |
| 2006/0157248 A1* | 7/2006 | Hoefer et al. .................. 166/300 |
| 2007/0287639 A1* | 12/2007 | Reddy et al. .................. 507/209 |
| 2008/0096774 A1 | 4/2008 | Tabary et al. |
| 2008/0269390 A1 | 10/2008 | Weitzel |

FOREIGN PATENT DOCUMENTS

| | | |
|---|---|---|
| WO | 01/94742 A1 | 12/2001 |
| WO | 2008/045417 A2 | 4/2008 |

* cited by examiner

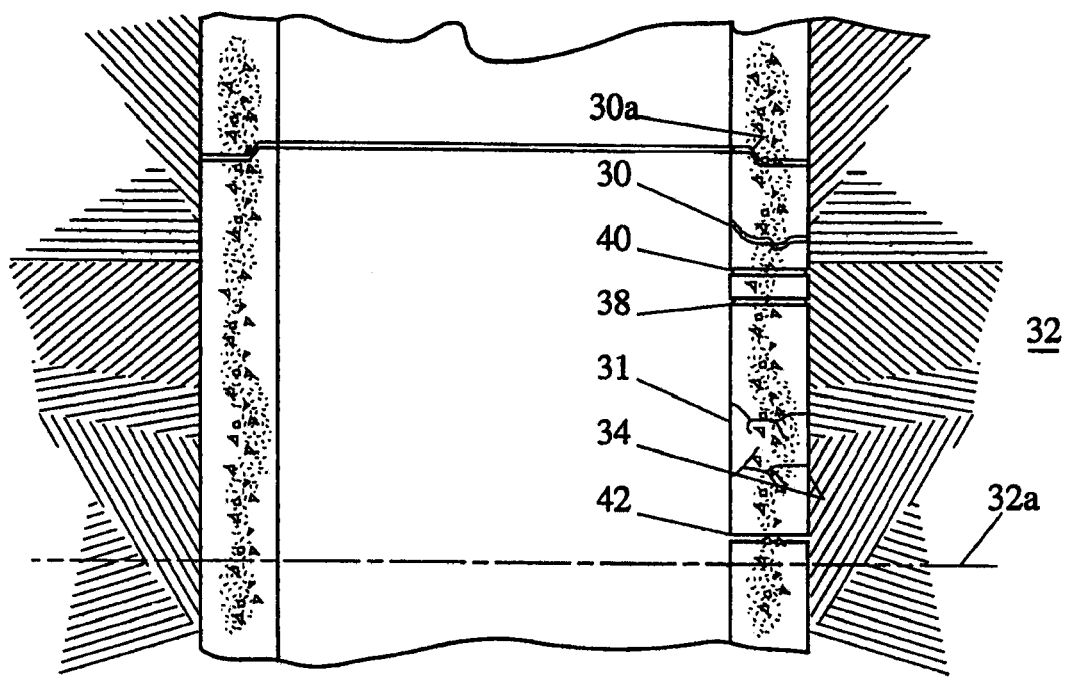

METHOD AND COMPOSITION FOR SEALING PASSAGES

CROSS REFERENCE TO RELATED APPLICATIONS

This application is a National Stage application based on International Patent Application No. PCT/AU09/000697, filed Jun. 3, 2009, which claims priority to Australian Patent Application No. 2008902804, filed Jun. 3, 2008, the disclosures of which are incorporated herein by reference.

FIELD OF THE INVENTION

The present invention relates to a method and composition for sealing passages such as cavities, fissures and like formations as encountered, for example, in geological bodies—for example in rocks surrounding mineshafts—though the method may be applicable to sealing of passages in other situations.

BACKGROUND OF THE INVENTION

From U.S. Pat. No. 4,296,932 is known a method of sealing faults or like passages in geological bodies situated close to a mineshaft and like structures, wherein a sealing composition comprising a rubber latex and a bituminous material is used to close the passage. Bituminous material is included in emulsion with the latex to prevent formation of a film in the latex when being injected. Such a film can form, even under low pressure and limits the depth of penetration into the fault. Such a film also can be easily broken due to the limited depth thereof.

However, it has been found that appropriate sealing of cracks may require injection of sealing composition at pressures from 1 Bar up to 200 Bar. At these pressures, pure natural latex, or natural rubber latex, being incapable of resisting hydrostatic pressure without setting, is unsuitable as it cannot be handled in the pumping equipment capable of achieving the required order of pressure.

Thus, in these situations, it appears that natural latex compositions or emulsions cannot be used, and the cost and sealing advantages that latex might enjoy in other situations is lost. Further, it is not desirable to use bitumen in such high pressure applications as it is a difficult material to pump and, is not of itself suitable as a sealing agent, even though it may promote coagulation of latex.

It is the object of the present invention to provide a method and composition for sealing a passage in a body that enables employment of a latex based composition while reducing the problems experienced with the prior art methods employing latex as described above.

SUMMARY OF THE INVENTION

With this object in view the present invention provides a method of sealing a passage in a body, such as a geological formation, with a sealing composition comprising substantially latex emulsion or colloid and lauric acid or a laurate compound; and at least one further selected additive wherein said composition is pumped into said passage where it is set or coagulated to form a seal.

The sealing composition, or grout, may comprise:
a) a major proportion of latex emulsion or colloid
b) a minor proportion of lauric acid or a laurate compound; and
c) a minor proportion of further selected additive(s).

Generally, though it is not desired to hereby limit the definition of 'passage' or 'passages', the passage(s) may take the form of a cavity, fault, fissure or other formation through which fluid may travel to cause leakage and/or flooding. The above method is particularly applicable to sealing of fluid passages in geological formations surrounding mine shafts and other passages.

In another embodiment, the present invention provides a sealing composition or grout comprising:
a) a major proportion of latex emulsion or colloid
b) a minor proportion of lauric acid or a laurate compound; and
c) a minor proportion of at least one further selected additive.

The sealing composition or grout may have alkaline pH as supplied for sealing applications, particularly in geological bodies.

By 'major proportion' of latex emulsion is intended an emulsion or colloid containing sufficient latex to form an effective seal once the emulsion or colloid is in situ within the passage to be sealed and setting or coagulation is initiated. Typically, latex will be supplied in emulsion or colloidal suspension with water. The latex used may be an industrial type such as is readily available from a number of sources in various grades. Latex emulsions of purity greater than 20% latex, more preferably 30% latex, even more preferably 50% latex, most preferably 60% latex and above, is suitable for use to prepare the latex component of the sealing composition. A natural rubber latex emulsion or colloid is especially suitable for use.

As to the lauric acid component, this typically makes up less than 0.5 wt % of the composition, preferably less than 0.2 wt % of the composition, more preferably less than 0.05 wt % of the composition. Lauric acid may be present in latex emulsions or colloids. Any additional amount to be added may also be determined by reference to the function that the lauric acid is to perform in aiding the handling of the latex composition; that is, by increasing the activation of the latex and making it more miscible with water. More specifically, the presence of lauric acid in the latex changes the rheological characteristics of the latex, making the material more free flowing and increasing the MST (Mechanical Stability Time). This is an important property when transporting the latex—lauric acid composition to the sealing site.

Lauric acid may be introduced through presence of a coconut oil component present in small proportion, for example between 0 and less than about 1 wt %, preferably between 0.01 and 0.4 wt %, more preferably between 0.01 and 0.1 wt %, in the latex emulsion. Coconut oil contains 90 wt % saturated fats with roughly 92 wt % saturated fatty acids, 6 wt % monounsaturated fatty acids, and 2 wt % polyunsaturated fatty acids. Of the saturated fatty acids, coconut oil contains approximately 45% lauric acid, 16.8 wt % myristic acid, 8.2 wt % palmitic acid and 8 wt % caprylic acid. The monounsaturated fat is oleic acid which may also impart beneficial properties to the composition in terms of the transport and sealing functions that it must perform in accordance with the method of the invention.

Presence of a laurate compound or salt of lauric acid may confer greater benefits for latex handling (as above discussed), particularly because miscibility of latex emulsions containing lauric acid in water is advantageously enhanced to promote effective use of the sealing composition. In such case, it is advantageous for the laurate compound to be present in alkaline solution with pH well above 7 and typically in the range 10-11.5. For example, water miscibility may be increased further by conversion of all, or a portion of lauric acid, to ammonium laurate which may be achieved by contacting a composition containing latex and lauric acid with an ammonia/water (ammonium hydroxide) solution.

The sealing composition must also contain at least one further selected additive to prevent setting of the latex and promote its flow properties to the site to be sealed at high pressures prior to the coagulation or setting step. Such additives especially include coagulation inhibitors (typically also in alkaline solution, again typically above 10 or 11) and activators. Further additives could include extreme pressure additives and friction resistant additives.

The further selected additive(s) may be, or include, alkaline compounds of kind found in detergents and soap-like substances; and plasticisers, advantageously in admixture, especially of the soap-like substances and the plasticisers, to provide the necessary flow and friction resistant properties required for the latex composition to penetrate the fluid passage. For example, a commercially available detergent containing a mixture of sodium phosphate compounds and available in alkaline solution, functions well as a coagulation inhibitor under alkaline conditions. Other additives may also tend to maintain the sealing composition at alkaline pH as it is pumped or transported to the sealing site.

The additives individually or collectively are typically present in relatively low proportions within the latex composition and preferably represent less than 10 wt %, more preferably less than 1 wt %, most preferably 0.1 to 0.7 wt %, of the total composition by weight as this may enable better penetration of sealing composition to sealing site. However, higher proportions, even significantly higher proportions, of additives may be included where required to achieve effective sealing operations. Optimum amounts of additives are selected having regard to site water analysis as described below.

Additives which may be employed to improve the flow properties, such as by viscosity enhancement, may be organic or inorganic in nature. Suitable additives may include carboxylic acids. Also inorganic compounds may be included which, without limitation, include borates, silicates, hydroxides and, in particular, metal salts thereof. A particularly useful additive to be included in the composition in accordance with the present invention is an alkali metal salt such as potassium hydroxide. Sodium hydroxide may also be included.

Any of the above additives may be employed in admixture with the latex. Such additives are advantageously hydrophilic and may be selected to achieve desired visco-modification effects, especially reduction with increased agitation. The additive may be selected to form a gel with water present in the latex and/or impart thixotropic properties to the composition. Therefore, as the structure of the composition breaks down at a constant shear rate, a viscosity reduction is achieved.

In some applications, a solution of further selected additive(s) may be introduced to a sealing site in treatment step(s) at a time different from the time of pumping of the sealing composition to the sealing site. For example, a solution of coagulation inhibitor, whether potassium hydroxide, the detergent above described or another alkaline reagent or mixture of alkaline reagents may be pumped to displace or neutralise water present at the sealing site, prior to pumping of the sealing composition to the sealing site, to delay coagulation or setting and formation of a more effective seal. To that end, water present at the sealing site, and in passages typical of that sealing site, is desirably analysed prior to commencement of the sealing operation so that the selection of additives and treatment steps are optimised.

In a preferred aspect, the method includes the step of introducing the sealing composition through a second passage intersecting the, generally fluid, passage to be sealed. The second passage is formed such that sealing composition is directed to the desired point of the passage to be sealed.

With respect to pumping equipment that may be used in carrying out the invention, there is made particular reference to reciprocating pumps of pressure capacity high enough to achieve advantageous high pressures of injection, which though dictated by the structural integrity of the body to be sealed, may vary from 1 Bar to 200 Bar.

Cementation pumps may be especially suitable. Such pumping equipment enables the desired control over introduction of the sealing composition to the leak passage to be sealed. The ability to employ conventional pumps, to introduce the latex composition to a fluid leak passage is a substantially important, and commercially advantageous, aspect of the presently proposed method, not previously achievable in the art to the best knowledge of the Applicant.

In particular, the ability to use a piston pump to deliver the sealing composition into the leak passage improves penetration of the latex into the leak passages by a factor of 2 to 3, without the problem of formation of easily broken film or premature setting as experienced with prior art methods where pure natural latex is solely employed as a sealing composition. The rate of delivery of sealing composition to the sealing site is determined with reference to leakage rates, for example of water, at the sealing site.

When the sealing composition is in situ at the sealing site, setting or coagulation may be initiated to form an effective seal. An effective seal is measured, for example, by water leak rates, where the passage to be sealed has formed a source of water leakage.

A convenient setting or coagulation mechanism is pH adjustment, setting or coagulation being induced by changing the pH of the sealing composition from alkaline to acidic. In such case, setting or coagulation is advantageously induced by bringing the sealing composition into contact with a pH reducing agent such as an acidic solution which may be introduced (as an accelerator) or already present in situ. That is, water present within a passage to be sealed may already be acidic tending to assist setting or coagulation through pH reduction. Brines may also promote setting or coagulation, for example, where sealing is to be performed in a body of salt. Heavy metal concentrations above a certain level may also promote setting or coagulation. Again, prior analysis of water present at the sealing site will determine whether in situ coagulation or setting will occur or whether accelerators need to be introduced.

Mineral acids, such as hydrochloric acid; organic acids, such as citric acid; and acid salts, such as chlorides, such as calcium chloride, nitrates, sulphates of ammonia and other salts of transition, light or other metals, especially heavy metals, may also be introduced in solution to the passage as accelerators to promote setting or coagulation. Degree of sealing may be measured by reference to water leakage rates where the passage to be sealed is a water leak source. For example, a reduction of water leak rates from 50 liters per minute to 30 liters per minute would show formation of a partial seal. Accelerator volume and concentration is selected having reference to the rate of sealing that is required. Where water leak rates are high, for example, a higher accelerator concentration is indicated.

The presently proposed method can effectively be used to seal fissures or cracks of narrow diameter, that can enable fluid ingress and leakage if not sealed, and without the use of very high pressure pump as was necessary previously.

The method is particularly suitable for application to sealing of fissures in and cracks within salt mines. Saline water may cause hydrolysis of latex so latex or sealing composition concentration is increased in water or alkaline solution (which may be inhibitor solution—for example a solution of the above described alkaline detergent), during successive treatment steps to allow sealing of fissures and cracks in the body of salt or like mineral without loss of latex. Such treatments may also be appropriate where water in mine leakage has a high salt content, that is, the water may be a brine. In this embodiment, potassium hydroxide solution or other suitable solution, preferably in dilute concentration, may first be injected to displace brine to stabilise the sealing site. Potassium hydroxide also tends to activate the latex emulsion or colloid. Then, optionally though desirably, an inhibitor solution may be introduced; such as a soap solution—a complex sodium phosphate compound containing soap powder or detergent, such as KT powder, being a preferred option. Finally, successive treatment steps involving injection of the sealing composition, at varying but increasing latex or sealing composition concentrations, typically in water, will raise the latex concentration, then forming an effective seal on induction of setting or coagulation.

The present invention has, as an advantage, the ability to employ latex based sealing compositions as sealing agents and the capacity to pump such compositions at high pressure to seal leaks, especially in geological formations.

DETAILED DESCRIPTION OF PREFERRED EMBODIMENTS OF THE INVENTION

The method and composition of the invention will be better understood from the following description of a preferred embodiment made with particular reference to the accompanying drawing in which:

FIG. 1 is a schematic cross-sectional view of a body, such as a geological formation, containing a mineshaft having cracks requiring sealing, for example, there may be a problem with water leakage through passages in the form of cracks and fissures into a mine shaft or like structures. If allowed to proceed unchecked, the mine shaft could be flooded with serious consequences. Such problems have previously been discussed in Australian Patent No. 534073, the contents of which are hereby incorporated herein by reference. This forms the sealing site to be treated.

As shown in FIG. 1, water penetrates through a fissure in surrounding rock 32 at a level 32a below the area in which water leakage occurs and passes through face 34 and cracks 30, and joints 30a in lining 31 to enter into the mine shaft. As most flows of water are likely to occur through cracks of larger cross section, it is desirable to seal cracks of large diameter prior to addressing leakage through smaller fissures or faults.

Following analysis of water present at the sealing site (site water) to determine the best sealing treatment strategy, a number of passages, in the example shown three passages, 38, 40 and 42, are drilled through the lining 31 of the mine shaft to the fault below large cracks such as crack 30. The sealing composition comprising a major proportion of a latex emulsion and a minor proportion of a lauric acid salt, ammonium laurate, as well as further selected additives, as described below, is pumped into the fault via the lower passage 38 by means of a reciprocating pump of the kind suitable for generating the high pressures required, for example a pump known in the pumping arts as a cementation pump. The sealing composition may be pumped to the sealing site following pumping of an alkaline solution, such as a KOH solution, through the sealing site, to 'stabilise' the site by displacing or neutralising chemical species that may cause premature setting or coagulation.

Pumping at high pressures from 1 Bar to 200 Bar, and higher will enable sealing of the large cracks and may therefore be advantageous in certain situations. Smaller cracks may also be sealed in such manner though sealing efficiency will depend on the flow characteristics of the latex composition and the pressure at which it is possible to present the latex composition to the cracks or fissures within the formation. If running water is present in the passage this may also have an effect for example by assisting sealing composition distribution.

The production of the latex based sealing composition used will be discussed further herein below.

As a result of site water analysis finding that rate of coagulation or setting may be promoted above in situ coagulation rate, it was found appropriate for an accelerator in the form of a dilute acid, for example hydrochloric acid, to be injected or pumped through an upper passage 40, i.e. downstream of the point where the sealing composition is injected, to promote coagulation thereof at an appropriate time after pumping of the latex. Faster coagulation rates may be achieved by increasing acid concentration and this may be appropriate where leakage flow rates are high and a quick seal is required. Acid is pumped to the sealing site using a separate pump to the cementation pump used for delivering the sealing composition to the sealing site.

The volume and concentration of hydrochloric acid accelerator—or any other accelerator such as citric acid or calcium chloride—to be introduced must be carefully controlled otherwise sealant may block entry passages such as 38, 40 and 42 before cracks are sealed. Any number of passages may be drilled through the mine lining into the faulty area to achieve the required sealing of leaks, fissures or like faults. Passages may be drilled in any pattern or formation to achieve sealing of leaks. For example, the latex based sealing composition may be introduced to one first passage through another passage intersecting with the first.

Delay of coagulation is effected by presence in the sealing composition of alkaline substances, e.g. ammonium laurate, ammonia and ammonium hydroxide, to maintain pH in alkaline conditions (pH about 10) during pumping as coagulation starts when pH is reduced below 6.5 by contact with the water itself and introduction of the accelerator as above described.

In a different strategy, where site water analysis confirms that no accelerator is required, for example the water is acidic, brine or contains a sufficient concentration of heavy metals, the water itself will cause the pH reduction that induces coagulation or setting.

The sealing composition and its production will now be described.

Lauric acid is present in a latex emulsion to be used in the sealing composition, in minor proportion through presence of a coconut oil component in quantity sufficient to provide a lauric acid content of about 0.03 wt % in the composition, to improve the properties of the latex emulsion when being handled. The presence of lauric acid provides significant advantages in regard to the handling of the latex specifically inhibiting the coagulation of the latex thus making it easier to pump into the passage being filled. It has also been found that the presence of the lauric acid supports the function of other coagulation inhibitors present within the sealing composition.

However, miscibility of the latex emulsion in water is improved substantially by converting this lauric acid into ammonium laurate by mixing latex emulsion or colloid with an ammonia/water (ammonium hydroxide) solution. To that end, ammonia or a source of ammonia may also be included within the sealing composition. This also tends to maintain pH in the strongly alkaline range, pH above about 10 assisting transport of sealing composition to the sealing site without coagulation.

It has also been found that the addition of alkaline potassium hydroxide (KOH) (or any commercially available degreaser containing Monobutyl Ether, Ethylene Glycol, and/or Nonionic Surfactants) to the latex helps reduce the mechanical stability time (MST) and increases the activation of the latex.

The latex composition includes further selected additives of a nature to reduce coagulation during pumping to the desired site(s) and, if desirable, to increase the pressure resistance and friction resistance of the latex composition. The additives, potassium hydroxide and detergent powder (for example the proprietary product KT powder which contains a mixture of sodium phosphates), are pre-mixed, preferably in the dry state, and introduced to an industrially available natural rubber latex emulsion of greater than 50% latex purity. In current practical usage, the latex was sourced at 60 to 80% purity. Natural or synthetic latex emulsions or colloids may be employed optionally at higher purities, but this will be dictated by economics and it is to be remembered that it would be most advantageous to incorporate the additives above described in order to prevent the problems of coagulation which has been known to occur in methods according to the prior art. Lauric acid or a salt of lauric acid may need to be added to synthetic latex compositions to provide desired rheological characteristics.

After mixing of the additives, conveniently available in a dry granular state, the additive mixture is introduced to the latex and mixed therein for a period of up to about 10 minutes. It has been found that a period of about 5 minutes is normally suitable. Further, it is undesirable that the latex be subjected to any unnecessary heating and therefore prolonged mixing for a greater period may be disadvantageous. Foam generation, also disadvantageous, may occur after prolonged mixing and this is ideally to be avoided and a foam suppressant, or surfactant, may be included within the sealing composition to reduce foam generation.

Latex emulsion may be obtained in 210 kg drums and the additives may be sourced in a dry state in similar containers. The additives are mixed, for example in a screw mixer, prior to addition and mixture with the latex, it is undesirable that premixed additive be stored for any greater time than 2 months if efficacy is to be maintained.

In one example, prior to pumping into the formation as previously described, approximately 1260 kg (6-210 kg drums) of latex containing a small amount of coconut oil (sufficient to achieve a lauric acid concentration of about 0.03 wt % in the final sealing composition) was mixed with an additive mixture comprising 2.5 kg of KT powder (inhibitor) and 1-5 kg of KOH. While this ratio of addition is ideally to be adhered to, it is possible that additions between 1-20 kg KOH and 1-3 kg KT powder will provide some level of advantage in the application of the latex. Further, the latex/additive mixture was mixed with water/ammonia solution in amount sufficient to convert lauric acid present in the latex to ammonium laurate at concentration favouring miscibility of the sealing composition with water. After preparation, the alkaline modified latex based sealing composition may be pumped into the cracks as above described.

In a further preferred embodiment, the composition is not pumped directly into the cracks through the passages 38 and 40 as shown in FIG. 1, but the passage 38, or any further passages, may be drilled such as to have a larger diameter close to the mine shaft over a length sufficient to accommodate a packer. The packer is then brought into communication with the reciprocating pump via a valve means. The pump may then be actuated and the composition is pumped into the crack, fissure or similar fault until the desired pressure is attained. At this point the valve may be switched off and the pump disconnected. The operation is then continued as many times as is necessary to achieve the required sealing of the faulty formation, that is, sealing site. Pumping of the latex composition at pressures of up to 10 MPa was conducted without significant coagulation of latex on pump components. Tests have also been successful in pumping the latex composition at pressures up to 40 MPa in mines where the wall structure is of sufficient strength to withstand such pressure.

The sealing method may be used with advantage in the sealing of cracks and fissures within a body of salt (NaCl) within a salt mine. In this case, concentration of the sealing composition is increased in a 5 wt % alkaline solution of KT powder (pH about 11) during successive treatment steps, involving pumping of sealing composition to the sealing site, to minimise latex hydrolysis and a poor quality seal. Such successive treatment steps advantageously follow a first treatment step involving displacement of any brine present within the cracks. This first treatment step may be achieved by pumping a 5 wt % solution of potassium hydroxide (which acts as an activator) through them. Then, prior to latex treatment, an inhibitor solution of 5 wt % KT powder (also alkaline) is pumped through the cracks to minimise prospects of coagulation of the sealing composition before the desired time.

Modifications and variations to the sealing method and composition of the present invention may be apparent to the skilled reader of this disclosure. Such modifications and variations are deemed within the scope of the present invention.

The invention claimed is:

1. A method of sealing a passage in a body to prevent inflow of a liquid through the passage, the method using a sealing composition comprising substantially latex emulsion or colloid and lauric add or a laurate compound; and at least one further selected additive preventing setting and promoting flow properties during transport of the sealing composition through the passage to a sealing site, the at least one further selected additive having one or more of the properties of inhibiting coagulation or maintaining the sealing composition at an alkaline pH and resisting hydrostatic pressure within the passage without setting of the composition, wherein said composition is pumped into said passage where it is set or coagulated to form a seal and wherein setting or coagulation of said composition is initiated once said composition is in situ within the passage to be sealed.

2. A method according to claim 1 wherein said sealing composition contains:
   a) a major proportion of the latex emulsion or colloid; and
   b) a minor proportion of the lauric add or the laurate compound.

3. A method according to claim 2 wherein said sealing composition is alkaline and setting or coagulation is induced by pH adjustment from alkaline to acidic pH, optionally by bringing the sealing composition into contact with a pH reducing agent or accelerator.

4. A method according to claim 2 wherein said sealing composition is pumped into said passage at a pressure from 1 Bar to 200 Bar.

5. A method according to claim 4 wherein a cementation pump pumps said sealing composition into said passage.

6. A method of claim 1 wherein the body is a geological formation.

7. A method of claim 6 wherein said geological formation is a body of salt.

8. A method according to claim 1 wherein a composition containing latex emulsion or colloid and (auric add is contacted with ammonia/water solution (ammonium hydroxide) to convert all, or a portion of, (auric add to ammonium laurate.

9. A method according to claim 1 including the step of introducing the sealing composition through a second passage intersecting the passage to be sealed.

10. A method according to claim 9 wherein the second passage is formed such that the sealing composition is directed to the desired point of the passage to be sealed.

11. A method according to claim 1 wherein a solution of further selected additive(s) is introduced to a sealing site at a time different from the time of pumping of the sealing composition to the sealing site.

12. A method according to claim 11 wherein an alkaline solution is pumped to displace or neutralise water present at said sealing site prior to pumping of said sealing composition to said sealing site.

13. A method according to claim 12 wherein said geological formation is a body of salt and, following pumping of said alkaline solution, successive treatment steps involve injection of the sealing composition at varying but increasing concentrations.

14. A method according to claim 13 wherein said alkaline solution is a solution of a coagulation inhibitor.

15. A method according to claim 1, wherein said at least one further additive is introduced into said passage separately from the sealing composition to control rate of setting or coagulation.

16. A method of sealing a passage in a body to prevent inflow of a liquid through the passage, the method using a sealing composition comprising substantially latex emulsion or colloid and lauric add or a laurate compound; and at least one further selected additive preventing setting and promoting flow properties during transport of the sealing composition through the passage to a sealing site, the at least one further selected additive having properties of inhibiting coagulation of the composition, maintaining the sealing composition at an alkaline pH and resisting hydrostatic pressure within the passage without setting of the composition, wherein said composition is pumped into said passage where it is set or coagulated to form a seal and wherein setting or coagulation of said composition is initiated once said composition is in situ within the passage to be sealed.

17. A method of sealing a passage in a body to prevent inflow of a liquid through the passage, the method using a sealing composition comprising substantially latex emulsion or colloid and lauric add or a laurate compound; and at least one further selected additive preventing setting and promoting flow properties during transport of the sealing composition through the passage to a sealing site, the at least one further selected additive having one or more of the properties of inhibiting coagulation, maintaining the sealing composition at an alkaline pH and resisting hydrostatic pressure within the passage without setting of the composition, wherein said composition is pumped into said passage where it is set or coagulated to form a seal and wherein setting or coagulation of said composition is initiated by reducing quantity of the at least one further selected additive relative to proportion of latex once said composition is in situ within the passage to be sealed.

* * * * *